United States Patent [19]
DeFoster et al.

[11] Patent Number: 5,754,549
[45] Date of Patent: May 19, 1998

[54] INEXPENSIVE TWO-WAY COMMUNICATIONS SWITCH

[75] Inventors: Steven Michael DeFoster, Rochester; Horst Lebrecht Truestedt, Pine Island, both of Minn.

[73] Assignee: International Business Machines Corporation, Armonk, N.Y.

[21] Appl. No.: 567,195

[22] Filed: Dec. 5, 1995

[51] Int. Cl.⁶ .............................. H04J 3/14; H04L 12/42
[52] U.S. Cl. ................................... 370/405; 370/406
[58] Field of Search ....................... 370/351, 389,
370/392, 400, 401, 402, 403, 404, 405,
406, 410, 420, 424, 431, 445, 447, 448,
452, 453, 454, 455, 456, 460, 462, 522;
395/200.21, 200.02, 200.06, 200.11; 340/825.5,
825.05

[56] References Cited

U.S. PATENT DOCUMENTS

| | | | |
|---|---|---|---|
| Re. 28,811 | 5/1976 | Pierce. | |
| Re. 33,426 | 11/1990 | Sugimoto et al. | 370/402 |
| 4,937,390 | 6/1990 | Sheehy | 370/401 |
| 4,973,953 | 11/1990 | Shimokawa et al. | |
| 5,299,312 | 3/1994 | Rocco, Jr. | |
| 5,327,431 | 7/1994 | Heske, III et al. | 370/403 |
| 5,331,636 | 7/1994 | Yang et al. | 370/454 |
| 5,337,311 | 8/1994 | Herzberg et al. | |
| 5,379,291 | 1/1995 | Herzberg et al. | |
| 5,416,768 | 5/1995 | Jahromi. | |
| 5,432,907 | 7/1995 | Picazo, Jr. et al. | |
| 5,491,687 | 2/1996 | Christensen et al. | 370/403 |

OTHER PUBLICATIONS

Truestedt, "Fibre Channel—Arbitrated Loop", pp. 1–4, May 1995.

*Primary Examiner*—Wellington Chin
*Assistant Examiner*—Huy D. Vu
*Attorney, Agent, or Firm*—Joan Pennington

[57] ABSTRACT

A two-way communications switch is provided that includes a first state machine connected to a first communications ring and a second state machine connected to a second communications ring. The first state machine is capable of transmitting data to the first communications ring and of receiving data from the first communications ring. The second state machine is capable of transmitting the data to the second communications ring and of receiving data from the second communications ring. Logic circuitry selectively connects the first state machine and the second state machine for receiving data from the second communications ring and transmitting data to the first communications ring and for receiving data from the first communications ring and transmitting data to the second communications ring.

8 Claims, 9 Drawing Sheets

| NODE | V | U | W | Y | Z | X | SWITCH |
|---|---|---|---|---|---|---|---|
| BIT VALUE | 1 | 2 | 4 | 8 | 16 | 32 | 64 |

STATE MACHINE 28-2'S MAP

REG A    00000001
REG B    01001111
REG C    01001110
INVERT   10110001    MAP OF NODES NOT ON LOOP 2

STATE MACHINE 28-1'S MAP

REG A    00000001
REG B    01001110
REG C    01001110
NOT
INVERT   01001110    MAP OF NODES NOT ON LOOP 1

FIG.9

| SWITCH 20-C | | SWITCH 20-B | | SWITCH 20-A | |
|---|---|---|---|---|---|
| A 00000111 | REG A 00000011 00000011 | | REG A 00000001 00000001 | |
| B 00011111 00011111 | REG B 00111111 00111111 | | REG B 01111111 01111111 | |
| C 00011000 00011000 | REG C 01111100 00111100 | | REG C 01111110 01111110 | |
| 11100111 | 11000011 | | 10000001 | |
| TABLE OF NODES NOT IN LOOP W | TABLE OF NODES NOT IN LOOP X | TABLE OF NODES NOT IN LOOP X | TABLE OF NODES NOT IN LOOP Y | TABLE OF NODES NOT IN LOOP Y | TABLE OF NODES NOT IN LOOP Z |

FIG.11

NODE 1 = 00000001
NODE 2 = 00000010
NODE 3 = 00000100
NODE 4 = 00001000
NODE 5 = 00010000
NODE 6 = 00100000
NODE 7 = 01000000
NODE 8 = 10000000

FIG.10

INEXPENSIVE TWO-WAY COMMUNICATIONS SWITCH

FIELD OF THE INVENTION

The present invention relates to a two-way switch for communicating between different communications rings or loops in a communications network, and more particularly to a two-way switch for communicating between different loops in either an optical fiber or electrical cable local area networks (LANs).

DESCRIPTION OF THE PRIOR ART

Various complex switching and interconnecting arrangements are known for connecting devices on different communications rings or loops in a communications network. Typically when a user of a fiber optic network wishes to communicate with a device in a different optical loop a N-way optical switch is required to connect the user's device to the other device. Known N-way optical switches are smart switches containing a number of microprocessors to control switching of ports and data flow and are complex and expensive.

U.S. Pat. No. 5,337,311 entitled "APPARATUS FOR CONNECTING TWO FIBER DISTRIBUTED INTERFACE RINGS," and issued Aug. 9, 1994, discloses apparatus for interconnecting networks that utilize a token based protocol, including an improved bridger and router. Bridgers and routers are commonly used for interconnecting networks. The disclosed bridger and router reads data on one ring and retransmits a copy of it on the other ring and must cope with complicated timing and buffering. The disclosed bridger/router includes special buffering and timing circuitry.

U.S. Pat. No. 5,379,291 entitled "APPARATUS FOR FIBER DISTRIBUTED DATA INTERFACE DYNAMIC STATION BYPASS VIA SKIPPING AND HOPPING," and issued Jan. 3, 1995, discloses a highly intelligent rights controlling concentrator (RCC) for separating and controlling rights of receiving and rights of transmitting of a group or groups of stations on a ring-of-trees local area network. The disclosed RCC is a complex device and requires complex software.

U.S. Pat. No. 5,299,312 entitled "[N]ETWORK FAULT RECOVERY BY CONTROLLABLE SWITCHING OF SUBNETWORKS," and issued Mar. 29, 1994, discloses a token-ring system for network fault recovery using subring modules for controlling the switching of a subring in and out of the main network of a token passing ring to automatically re-route data to isolate faults.

U.S. Pat. No. 5,416,768 entitled "INTERCONNECTING COMMUNICATIONS NETWORKS," and issued May 16, 1995, discloses a digital cross-connection apparatus for interconnecting first and second communications networks having multiplexed data channels. The digital cross-connection apparatus is a highly intelligent switch for selectively transferring data from one network to another. It actively monitors the data coming through and can very selectively add and drop data between networks. It stores and retimes the data, and can convert frame data from one form to another.

A need exists for a two-way communications switch for communicating between different loops in a fiber optic or wire network that is a simple device and inexpensive to manufacture.

SUMMARY OF THE INVENTION

A principal object of the present invention is to provide an improved two-way switch for communicating between different loops in either an optical fiber or electrical cable local area networks (LANs). Other important objects of the present invention are to provide such an improved two-way switch that is a simple device and inexpensive to manufacture; and to provide such an improved two-way switch that overcomes many of the disadvantages of prior art arrangements.

In brief, a switch is provided that includes a first state machine connected to a first communications ring and a second state machine connected to a second communications ring. The first state machine is capable of transmitting data to the first communications ring and of receiving data from the first communications ring. The second state machine is capable of transmitting the data to the second communications ring and of receiving data from the second communications ring. Logic circuitry selectively connects the first state machine and the second state machine for receiving data from the second communications ring and transmitting data to the first communications ring and for receiving data from the first communications ring and transmitting data to the second communications ring.

DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
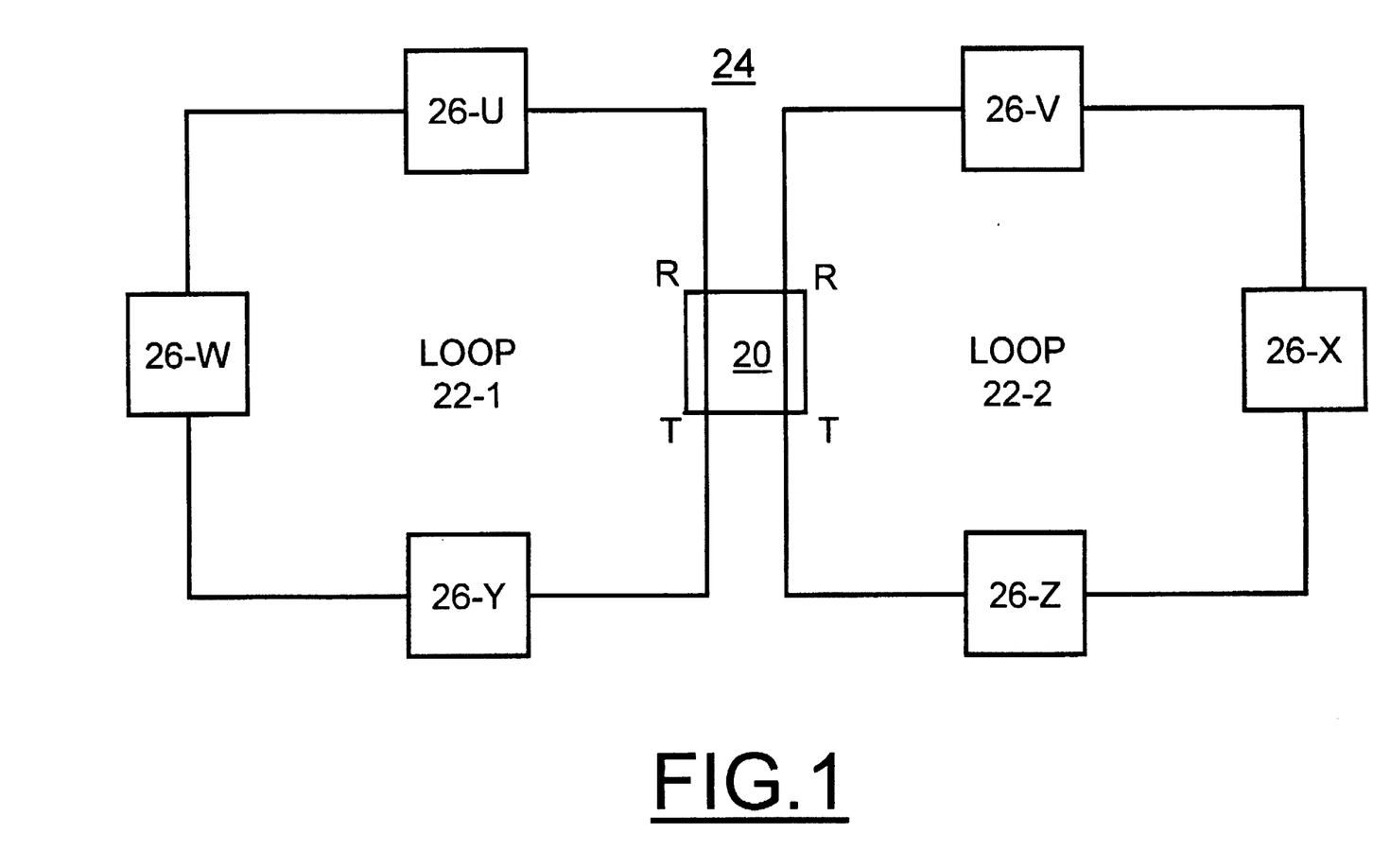
FIG. 1 is a block diagram of a communications system including two loops that are interconnected by a two-way communications switch of the invention.
Figure 2:
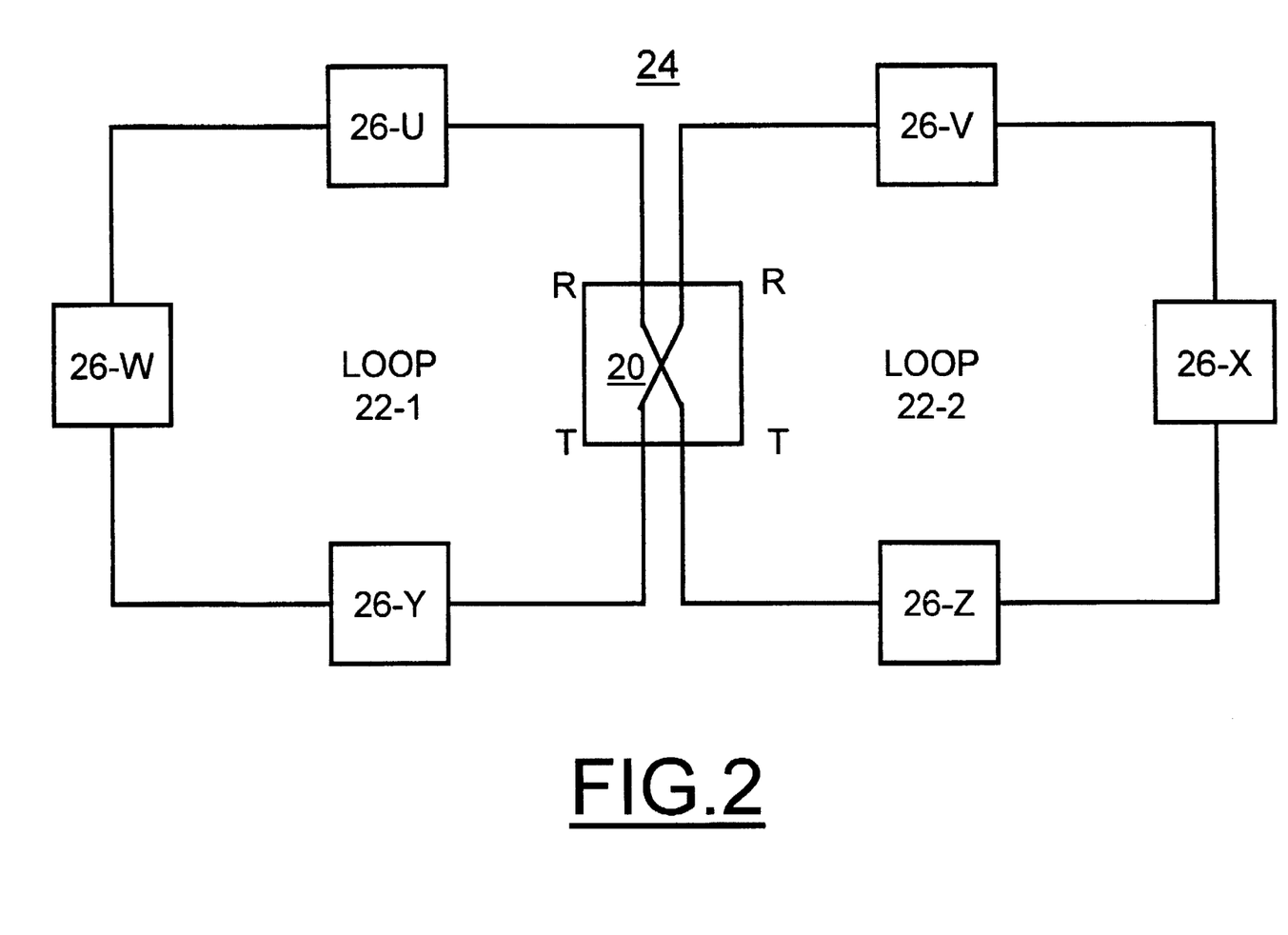
FIG. 2 is a block diagram similar to FIG. 1 with the two-way communications switch of the invention engaged to provide a single loop.

Having reference now to the drawings, FIGS. 1 and 2 illustrate a two-way communications switch generally designated by the reference character 20 for interconnecting two loops 22-1 and 22-2 of a communications system 24. Switch 20 is connected to two independent optical fiber loops, or electrical cable (wire) loops 22-1 and 22-2. Loop 22-1 includes multiple ports or devices 26-U, 26-W and 26-Y connected together by the loop that utilizes a Fibre Channel Arbitrated Loop (FC-AL) Standard for controlling access to the loop by a particular attached device 26. Other protocols could use the method of the invention using their own signalling methods to establish a circuit. Loop 22-2 includes multiple ports or devices 26-V, 26-X and 26-Z connected together by the loop. Switch 20 can operate in both full duplex and half duplex modes.

Switch 20 is a simple two-way switch that advantageously can be used instead of conventional, more expensive multi-way switches. Switch 20 when engaged inexpensively allows a device 26 in one loop 22-1 or 22-2 to temporarily connect to a device 26 in another loop 22-2 or 22-1 so that the two devices can directly communicate as illustrated in FIG. 2. Switch 20 functions basically as an agent of a particular port 26 desiring a connection. When the communication is done, the path is broken and the two loops 22-1 and 22-2 become independent again as illustrated in FIG. 1. Switch 20 routes traffic in real time and thus requires no buffering or timing circuitry.

When the switch 20 is not enabled, it simply repeats what it received. Switch 20 repeats the messages received in loop 22-1 and send them around loop 22-1 and switch 20 similarly repeats and sends the messages received in loop 22-2. Neither loop 22-1 nor loop 22-2 would even know the switch 20 existed when it is not in use. Switch 20 is transparent to both loops.

Referring to FIGS. 1 and 2, the operation of switch 20 may be summarized considering the following example. Assume port 26-U that is located in loop 22-1 wished to send data to port 26-V that is located in loop 22-2. Port 26-U would arbitrate for control of the loop 22-1. If loop 22-1 is not busy, port 26-U wins the arbitration. Port 26-U sends a predetermined command OPN (V, U) indicating that it wished to communicate with port 26-V. Switch 20 monitors open commands and compares the address of the selected port 26-V with addresses of the ports not on the loop 22-1 of the sending port 26-U. Since port 26-V is on loop 22-2, and is not on loop 22-1, switch 20 intercepts the command OPN (V,U).

Then switch 20 sends an arbitration signal around loop 22-2. If loop 22-2 is not busy, the switch 20 wins the arbitration in loop 22-2 and forwards the command OPN (V,U) to port 26-V. Port 26-V receives the command OPN (V,U) and the circuit between Ports 26-U and 26-V is established.

Once the devices 26-U and 26-V in both loops 22-1 and 22-2 have direct connections through the switch 20, the switch 20 automatically switches, making the two loops 22-1 and 22-2 into one large loop as shown in FIG. 2. Ports 26-U and 26-V then exchange data and acknowledge signals. When done, both ports 26-U and 26-V close the connection. With both ports 26-U and 26-V have closed, switch 20 receiving the two close signals, switches back, breaking the temporary large loop into its original two smaller loops 22-1 and 22-2, as shown in FIG. 1.

Figure 3:
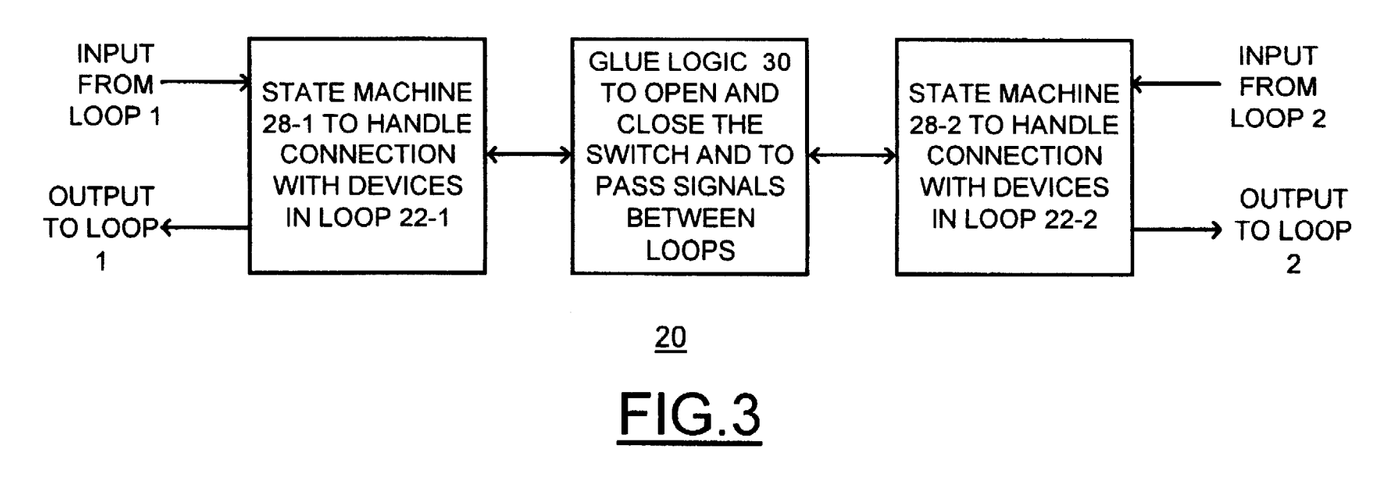
FIG. 3 is a high level block diagram of the two-way communications switch of FIG. 1.
Figure 5:
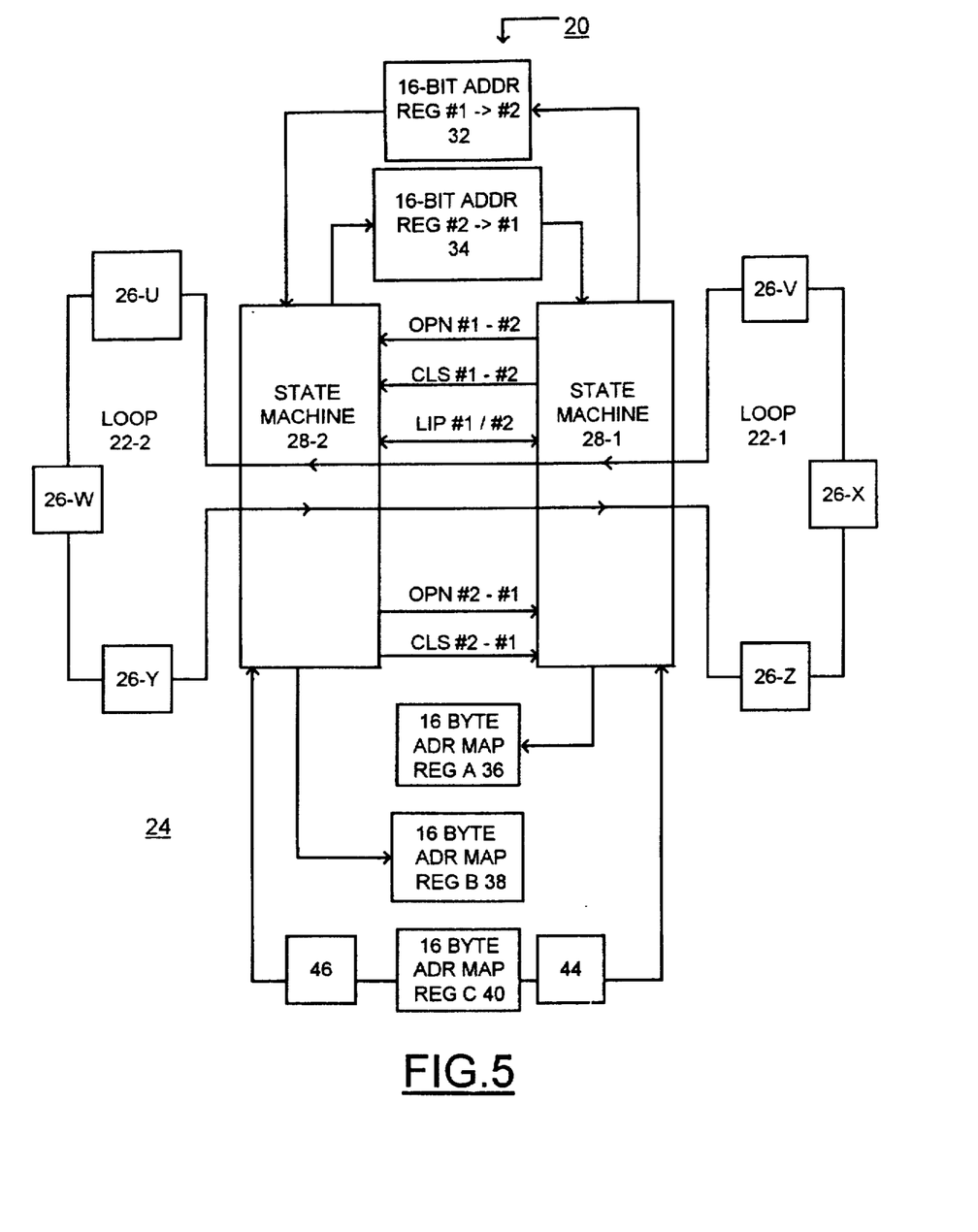
FIG. 5 is a more detailed block diagram similar to FIG. 2 illustrating address map registers and control protocol of the two-way communications switch of FIG. 1.

Referring to FIGS. 3 and 5, the switch 20 includes a first state machine 28-1 to handle connection with devices 26-V, 26-X, 26-Z of loop 22-1 and a second state machines 28-2 to handle connection with devices 26-U, 26-W, 26-Y of loop 22-2. State machines 28-1 and 28-2 have just enough intelligence to interpret a few simple instructions and to arbitrate to get control of the two loops. State machines are used by the current Fibre Channel Arbitrated Loop (FC-AL) Standard to handle communications in a loop for any given port. The FC-AL state machine generates and handles the communications signals to open a connection, close a connection, send data, acknowledge data, and the like. The state machines 28-1 and 28-2 are a simplified version of the FC-AL state machines. The state machines 28-1 and 28-2 include some functions of the FC-AL state machines with added features. Switch 20 uses the state machines 28-1 and 28-2 with a glue logic 30 specialized to support the function of the switch. The glue logic 30 opens the switch 20 for the two independent loops 22-1 and 22-2 and closes the switch 20 to make the two loops 22-1 and 22-2 into one loop when arbitration is won on the second of the two loop 22-1 and loop 22-2 and opens or resets the switch 20 to put the configuration back to the two original loops when both devices, such as 26-U and 26-V, one in each of the original loops send signals to close the connection.

Figure 4:
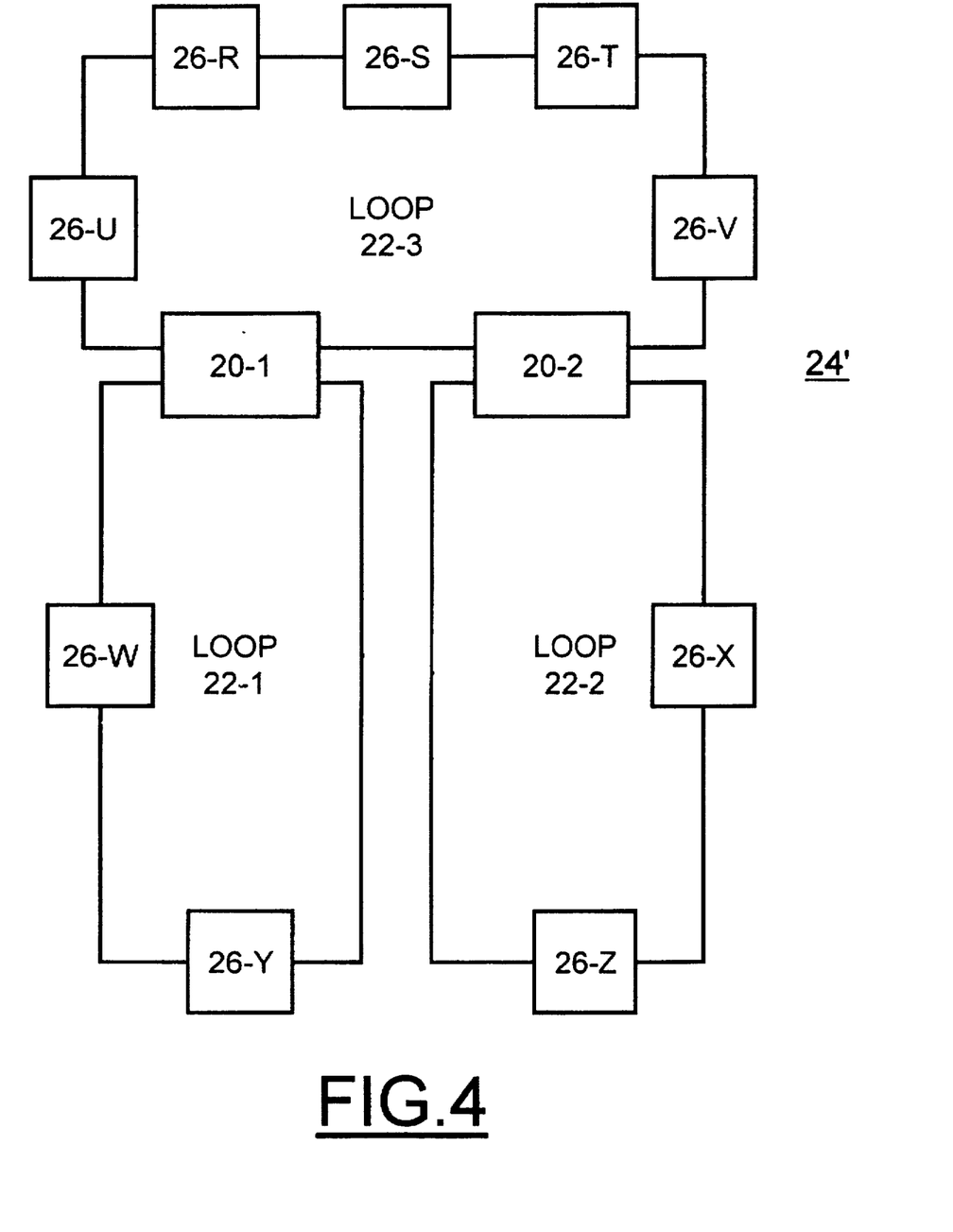
FIG. 4 is a block diagram of a communications system including three loops that are interconnected by two of the two-way communications switches of FIG. 1.
Figure 9:
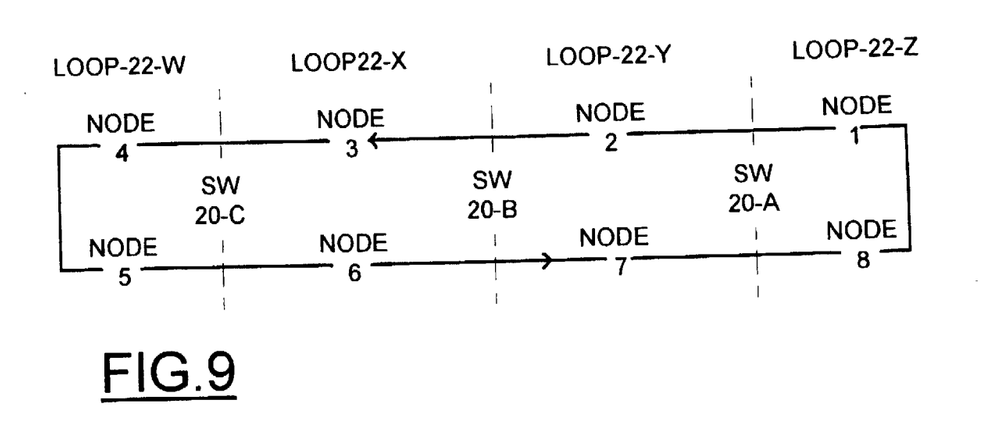
FIG. 9 is a block diagram of a communications system including four loops that are interconnected by three of the two-way communications switches of FIG. 1.

Various configurations of communications networks including multiple loops can be accomplished using multiple two-way switches 20, such as shown in FIGS. 4 and 9.

FIG. 4 provides a block diagram of a communications system 24' including three loops 22-1, 22-2 and 22-3 that are interconnected by two of the two-way communications switches 20-1 and 20-2. The number of loops can be greater than three, the only limitation being there can only be one path between any two ports.

FIG. 9 illustrates another communications system including four loops 22-W, 22-X, 22-Y, and 22-Z that are interconnected by three of the two-way communications switches 20-A, 20-B and 20-C.

Referring now to FIG. 5, there is shown a more detailed block diagram similar to FIG. 2 illustrating address map registers and control protocol of the two-way communications switch 20. Switch 20 includes a 16-bit address register #1 →#2 32, a 16-bit address register #2 →#1 34, a 16 byte address map register A 36, a 16 byte address map register B 38, and a 16 byte address map register C 40.

Figure 5A:
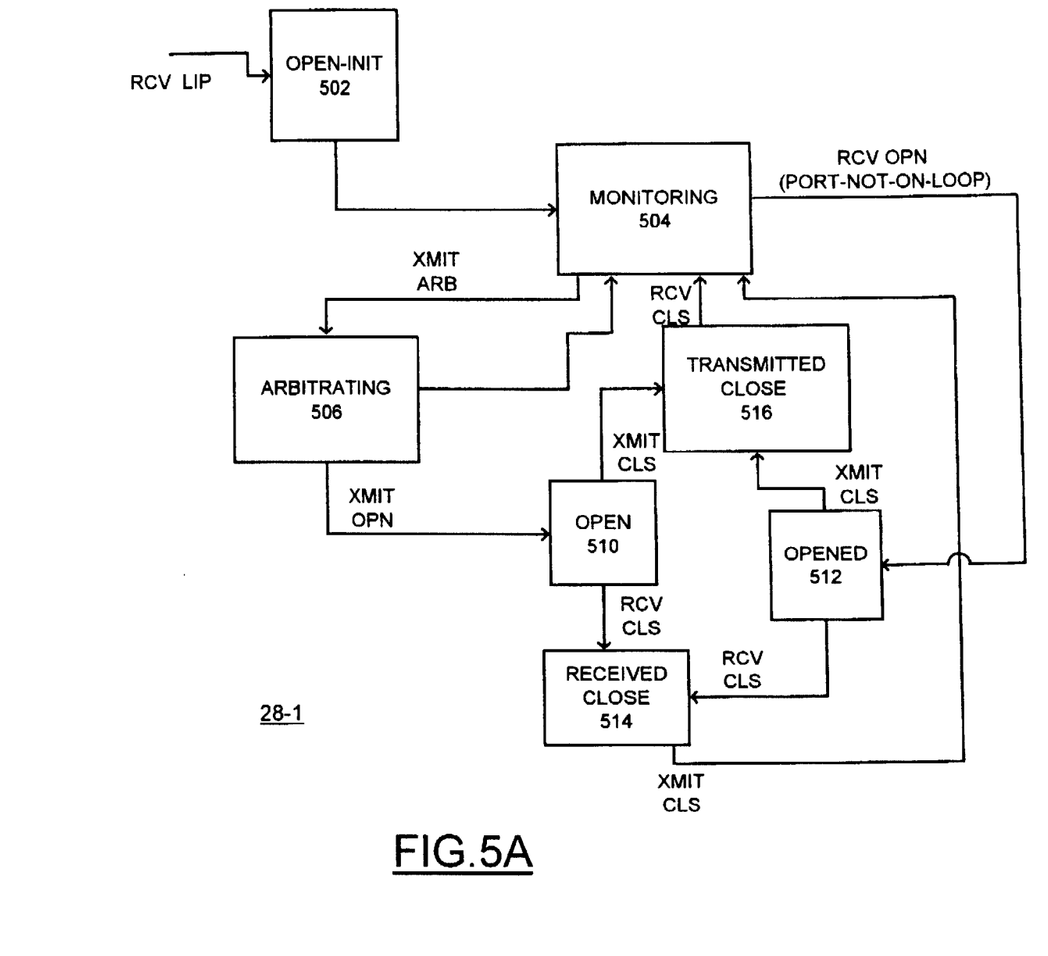
FIG. 5A is a diagram illustrating a state machine of the two-way communications switch of FIG. 1.
Figure 6:
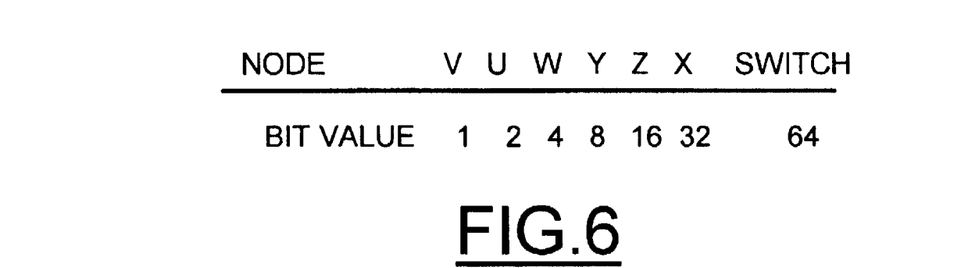
FIG. 6 is a table providing a simplified address example for use with the two-way communications switch of FIG. 1.
Figure 7:
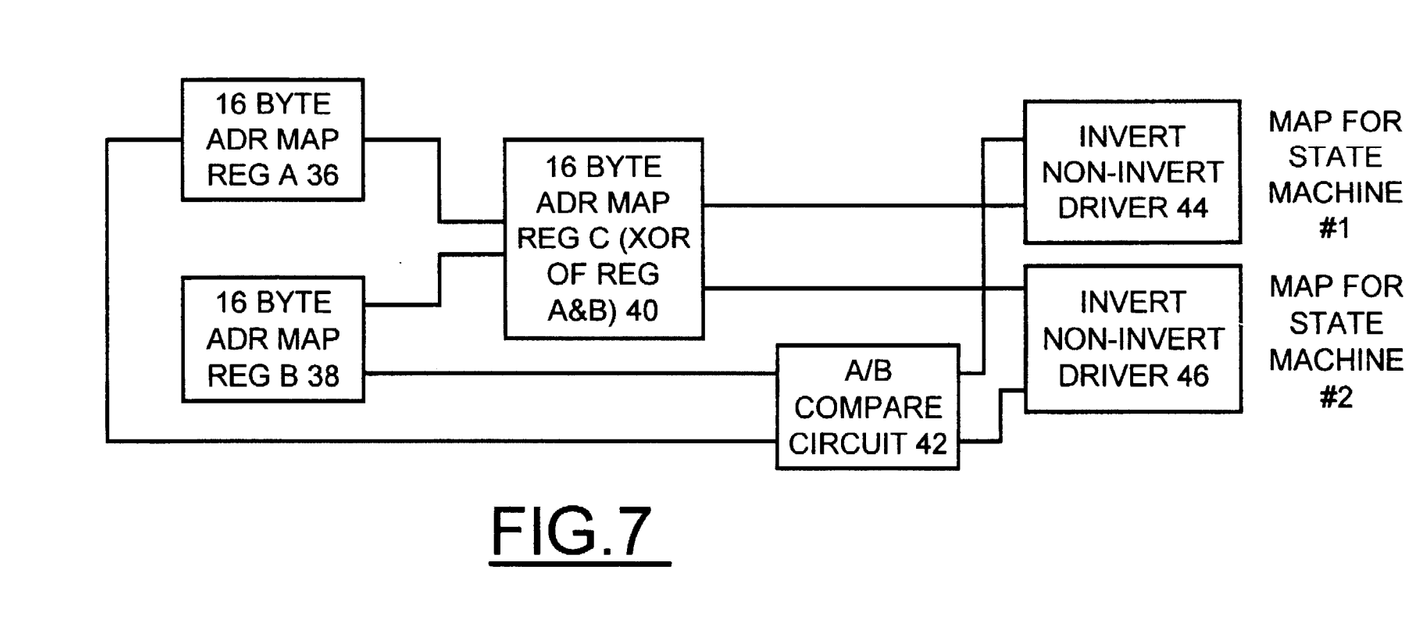
FIG. 7 is a simplified circuit diagram illustrating an address mapping function of the two-way communications switch of FIG. 1.
Figure 8:
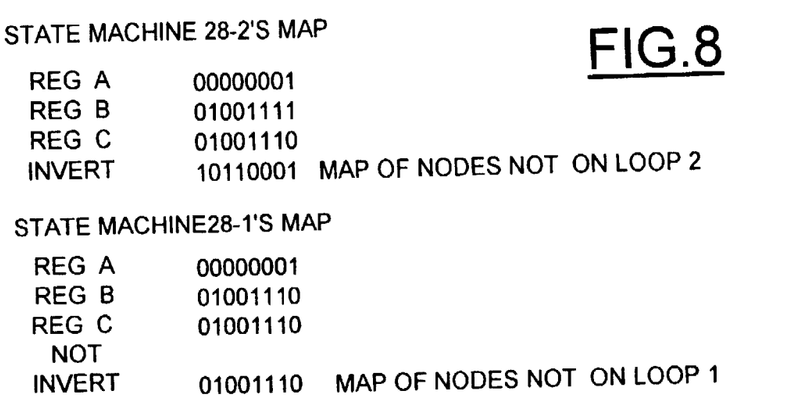
FIG. 8 is a table illustrating a simplified 8-bit address mapping function of the two-way communications switch of FIG. 1.

Referring also to FIGS. 5A, 6, 7, and 8, the operation of switch 20 may be understood. FIG. 5A illustrates the state machines 28-1 and 28-2 of the two-way communications switch 20. FIG. 6 is a table providing a simplified address example for use with the two-way communications switch 20. FIG. 7 illustrates an address mapping function of the two-way communications switch 20. FIG. 8 provides a simplified 8-bit address mapping function for the state machines 28-1 and 28-2.

As shown in FIG. 7 and may be understood with reference to FIG. 8, the 16 byte address map register C 40 contains an exclusive ORed combination of the contents of the 16 byte address map register A 36 and the 16 byte address map register B 38 as labeled (XOR of REG A&B). Register C 40 holds the map that the switch 20 uses to determine what nodes are not in the local loop on either side of the switch. Register C 40 supplies the pattern for the maps for both state machine 28-1 and state machine 28-2. However, the maps for state machine 28-1 and state machine 28-2 are not identical. One is the negation of the other. Which map is the negation of the other is a function of a particular node on one side of the switch 20 that started the initialization process. To determine which map gets inverted, registers A and B are compared by an A/B compare circuit 42. If A has a bigger value than B, then state machine 28-1's map is inverted by an invert/non-invert driver 44. If B has a bigger value than A, then state machine 28-2's map is inverted by an invert/ non-invert driver 46.

The mapping function for the state machines 28-1 and 28-2 may be understood from the following description of the system 24. At start up time, the loops 22-1 and 22-2 go through a loop initialization. A predetermined initialization protocol signal, such as a Loop Initialization Primitive (LIP) instruction is generated by any one of the nodes 26-U, 26-W, 26-Y, 26-V, 26-X or 26-Z. When this LIP instruction is generated, the switch 20 automatically switches and makes the two loops 22-1 and 22-2 into one large loop, as illustrated in FIGS. 5 and 2. Then a 16 byte address map is passed to every device 26-U, 26-W, 26-Y, 26-V, 26-X and 26-Z in the one large loop. Each device 26-U, 26-W, 26-Y, 26-V, 26-X or 26-Z sets a bit that corresponds to its address and then passes the 16 byte map on. In this way, all of the devices in both loops learn each other's address. The switch 20 looks at the 16 byte address map when the 16 byte address map is passed to it and switch 20 picks an unused address to be its address.

As shown in FIG. 5, the switch 20 uses the two special 16 byte registers 36 and 38 that record the state of the 16 byte address map when the device map enters and/or leaves one side of the switch. These registers 36 and 38 are used to determine what addresses are not in each loop 22-1 or 22-2.

Consider now the example as shown in FIG. 6, together with an 8 bit map as shown in FIG. 8 to represent the 16 byte address map in order to make the example easier to follow.

Any node 26-U, 26-W, 26-Y, 26-V, 26-X or 26-Z can be the master node in this system 24. For this example, assume that node 26-V is the master node which generates a loop initialization signal (LIP) that is received at a open initialization block 502 in FIG. 5A. Node 26-V starts passing the 8-bit address map around. The map starts as 00000000. After node 26-V passes it on and adds its address, the map shows 00000001. Address map register A records a 00000001. Node 26-U adds its bit, so the map changes to 00000011. Node 26-W adds its bit, so the map becomes 00000111. Node 26-Y adds its bit, so the map becomes 00001111. The switch 20 selects the unused 64 bit for its own address and adds it to the map, so the map becomes 01001111. This map is put in register B. Register A and B are XORed and put into a third register C. The result is 01001110.

In our example, the base map in register C holds 01001110. Since in our example B>A, state machine 28-2's map is inverted and state machine 28-1's map is not inverted as set forth in the following TABLE A.

TABLE A

| | STATE MACHINE 28-2's map | |
| --- | --- | --- |
| REG A | 00000001 | |
| REG B | 01001111 | |
| REG C | 01001110 | |
| INVERT | 10110001 | Map of Nodes NOT on loop 2 |
| | STATE MACHINE 28-1's map | |
| REG A | 00000001 | |
| REG B | 01001110 | |
| REG C | 01001110 | |
| NOT INVERT | 01001110 | Map of nodes NOT on loop 1 |

After initialization, assume port 26-Z on loop 22-1 wishes to communicate with port 26-U on loop 22-2. Port 26-Z in loop 22-1 sends out an ARB Z to get control of the loop. If it wins the arbitration, it stops repeating messages from other devices in the loop, thus opening the loop in loop 22-1 and blocking any other ports 26-V, and 26-X on loop 22-1 from sending messages.

Port 26-Z in loop 22-1 then sends an open instruction OPN(U,Z). The switch 20 monitors all open commands at a monitoring block 504 in FIG. 5A. Switch 20 checks for node 26-U in its map table if node 26-U has an address that is not in loop 22-1.

In this example, node 26-U is not a member of loop 22-1, so the switch 20 sends the OPN signal to state machines 28-2 on loop 22-2 by toggling the OPN #1 →#2 line (FIG. 5) to state machine 28-2. State machine 28-1 breaks loop 22-1. It also stores the value for node 26-U and node 26-Z in the 16-bit address register #1 →#2 32. State machine 28-2 using the address the switch took for itself at initialization, arbitrates for control of loop 22-2 at an arbitrating block 506 in FIG. 5A.

When state machine 28-2 wins the arbitration, state machine 28-2 takes control of loop 22-2. Once this occurs, state machine 28-2 breaks loop 22-2. Now all of the nodes in loop 22-1 and loop 22-2 are in one big loop. State machine 28-2 then reads the 16-bit word out of the 16-bit address register #1 →#2 32. State machine 28-2 uses this value to send an OPN(U,Z) in the second loop 22-2 at an open block 510 in FIG. 5A. Node 26-U receives the OPN(U,Z) command. Node 26-U then stops repeating messages from other devices in the loop 22-2. Now a direct connection is set up between nodes 26-Z and 26-U and data is transmitted between node 26-U and node 26-Z.

When node 26-U transmits a close instruction CLS, the CLS is received by state machine 28-2 and it transitions from opened block 512 to the closed block 514 in FIG. 5A. The state machine 28-2 logs that it detected a received close. State machine 28-2 toggles the CLS #2 →#1 line to state machine 28-1. State machine 28-1 logs that it detected a transmitted close. State machine 28-1 then transmits the close instruction CLS to port 26-Z and it transitions from the open block 510 to closed block 516 in FIG. 5A. Node 26-Z then logs that it has received a close. When Node 26-Z has completed transmitting all data, it then transmits a close itself. Then node 26-Z having both received and transmitted a close, closes. Now node 26-Z simply monitors the loop 22-1 and repeats messages it receives around the loop. This close gets passed on to state machine 28-1. Since state machine 28-1 has both received and transmitted a close, state machine 28-1 closes and restores loop 22-1. State machine 28-1 then sends a signal to state machine 28-2 to close. State machine 28-1 then goes back to monitoring block 504. State machine 28-2 has both received and transmitted a close, so state machine 28-2 closes, restoring loop 22-2. State machine 28-2 then goes back to monitoring block 504. Port 26-U receives a CLS and closes itself. Now port 26-U is closed and goes back into the monitor state, repeating frames it receives. The two loops 22-1 and 22-2 are now back to operating as two independent loops.

In the case that state machine 28-2 does not win arbitration in loop 22-2, state machine 28-2 stays in the arbitration state. Node 26-Z gets no reply and after a time, times out. When node 26-Z times out, it sends a CLS. The CLS is sent to state machine 28-1. State machine 28-1 toggles the CLS #1 →#2 control line to state machine 28-2. State machine 28-2 is not in the OPEN state, since it is still arbitrating when it receives the signal to generate a CLS, it goes back to the monitoring state 504. Loop 22-2 is now operating as an independent loop. State machine 28-2 sends a request to generate a CLS back to state machine 28-1. Since state machine 28-1 is in the OPENED state 512, it then sends a CLS back around the loop 22-1. Since state machine 28-1 has both received and transmitted a close, it closes and starts repeating the frames it receives around loop 22-1. Node 26-Z receives the CLS from state machine 28-1. Since node 26-Z has both transmitted and received a CLS, it closes, and loop 22-1 is back to operating as an independent loop.

Figure 10:
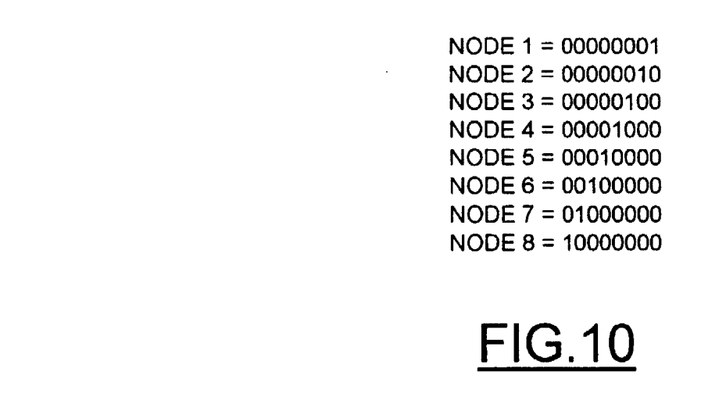
FIG. 10 is a table providing a simplified address example for use with the two-way communications switches of FIG. 9.
Figure 11:
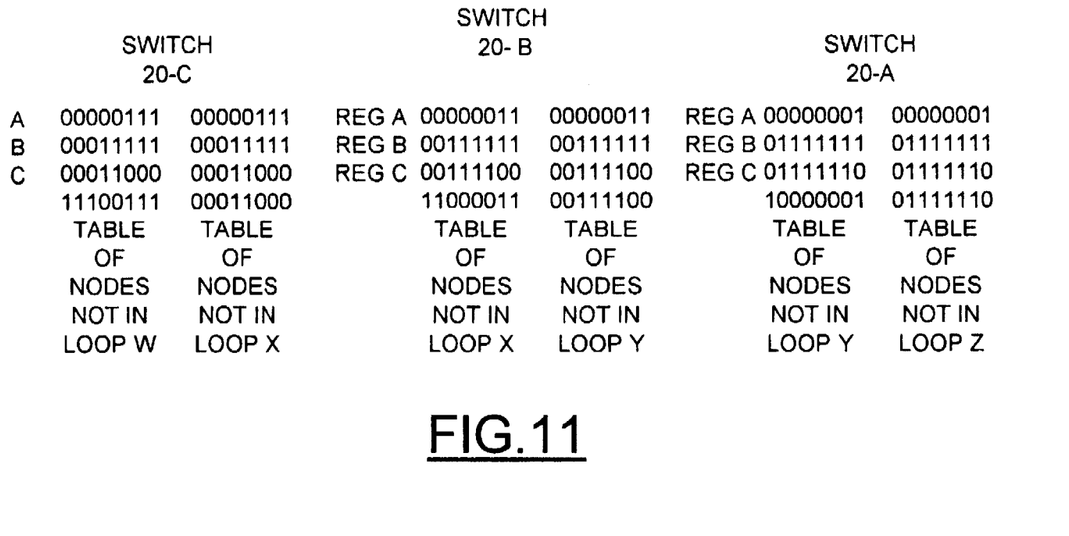
FIG. 11 is a table illustrating a simplified 8-bit address mapping function of the three two-way communications switches of FIG. 9.

Referring now to FIGS. 9, 10 and 11, the operation of the three switches 20-A, 20-B and 20-C to selectively connect any of the nodes 1-8 may be understood as follows. In FIG. 10 a simplified address example for the eight nodes 1-8 is provided as set forth in Table I.

TABLE I

| |
| --- |
| NODE 1 = 00000001 |
| NODE 2 = 00000010 |
| NODE 3 = 00000100 |
| NODE 4 = 00001000 |
| NODE 5 = 00010000 |
| NODE 6 = 00100000 |
| NODE 7 = 01000000 |
| NODE 8 = 10000000 |

In this example for simplicity the switch addresses are not included in Table I. In FIG. 9, the four loops 22-W, 22-X, 22-Y, and 22-Z are interconnected with the two-way communications switches 20-A, 20-B and 20-C. Assuming that node 1 masters at initialization, the address maps as shown in FIG. 11 are generated.

The operations to selectively connect the nodes 8 to node 4 may be understood as follows. First switch 20-A reads its table of nodes not in loop Z when it detects the OPN 4 signal from node 8 and sees that a bit representing node 4 is in this table, so the switch 20-A opens and connects loop 22-Z to loop 22-Y. Switch 20-B reads its table of nodes not in loop Y when it detects the OPN 4 and sees that a bit representing 4 is in this table, so the switch 20-B opens and connects loop 22-Y to 22-X. Now loops 22-Z, 22-Y and 22-X are all one loop.

Switch 20-C reads its table of nodes not in loop X when it detects the OPN 4 and sees that a bit representing node 4 is in this table, so the switch 20-C opens and connects loop 22-X to 22-W. Now loops 22-W, 22-X, 22-Y and 22-Z are all one loop. Node 4 is in loop W, so a connection is opened.

The operations to selectively connect the nodes 5 to node 1 may be understood as follows. First switch 20-C reads the table of nodes not in loop W when it detects the OPN 1 and sees that a bit representing 1 is in the table, so the switch 20-C opens and connects loop 22-W to loop 22-X. Switch 20-B reads the table of nodes not in loop X when it detects the OPN 1 and sees that a bit representing 1 is in the table, so the switch opens and connects loop 22-W to loop 22-Y. Now loops 22-W, 22-X and 22-Y are all one loop.

Switch A reads the table of nodes not in loop Y when it detects the OPN 1 and sees that a bit representing 1 is in the table, so the switch opens and connects loop 22-Y to 22-Z. Now loops 22-W, 22-X, 22-Y and 22-Z are all one loop. Node 1 is in loop Z, so a connection is opened.

The operations to selectively connect the nodes 7 to node 3 may be understood as follows. First switch 20-A reads the table of nodes not in loop Y when it detects the OPN 3 and sees that a bit representing 3 is not in the table, so the switch stays closed. The signal continues around loop 22-Y.

Switch 20-B reads the table of nodes not in loop Y when it detects the OPN 3 and sees that a bit representing 3 is in the table, so the switch opens and connects loop 22-Y to loop 22-X. Node 3 is in loop 22-X, so the connection is opened. In summary, multiple switches 20 and loops 22 can be cascaded together using the tables of nodes not in each loop of the switches 20 to connect selected nodes of different loops.

For a fiber channel implementation with N optical fiber loops 22-1 through 22-N, a total of 126 unique addresses or different ports may be included with all the N loops connected by switches 20. It should be understood that by using other protocols, this limitation could be avoided. It should be understood that switch 20 can be used in other systems and in combination with other types of switches including expensive multiway switches. It should be understood that switch 20 can be used with multiported nodes.

While the present invention has been described with reference to the details of the embodiments of the invention shown in the drawing, these details are not intended to limit the scope of the invention as claimed in the appended claims.

What is claimed is:

1. A two-way communications switch comprising:

a first state machine connected to a first communications ring, said first state machine being capable of transmitting data to said first communications ring and of receiving data from said first communications ring;

a second state machine connected to a second communications ring, said second state machine being capable of transmitting said data to said second communications ring and of receiving data from said first communications ring;

each of said first state machine and said second state machine including means for generating a control signal; and including means for monitoring predetermined commands sent by a first port to open communications with a selected second port;

logic means responsive to said control signal for selectively connecting said first state machine and said second state machine for receiving data from said second communications ring and transmitting data to said first communications ring and for receiving data from said first communications ring and transmitting data to said second communications ring;

address means for storing addresses of ports not on said first communications ring and address means for storing addresses of ports not on said second communications ring;

wherein said first state machine include means for comparing an address of said selected second port with said stored addresses of ports not on said first communications ring; and means responsive to compared matching addresses for sending an open signal and said address of said selected second port to said second state machine;

wherein said second state machine includes means responsive to said open signal from said first state machine for arbitrating for control of said second communications ring, and means responsive to controlling said second communications ring for sending a predetermined command to open communications with said selected second port; and wherein said first state machine and said second state machine include means for monitoring predetermined commands sent by said selected second port to close communications with said first port and means for monitoring predetermined commands sent by said first port to close communications with said selected second port.

2. A two-way communications switch as recited in claim 1 wherein said first state machine include means responsive to received predetermined commands to close communications from both said selected second port and said first port for closing and restoring communication in said first communications ring.

3. A two-way communications switch as recited in claim 1 wherein said second state machine include means responsive to received predetermined commands to close communications from both said selected second port and said first port for closing and restoring communication in said second communications ring.

4. A two-way communications switch as recited in claim 1 further includes address means for storing addresses of ports on said first communications ring and said second communications ring.

5. A two-way communications switch as recited in claim 1 wherein said second state machine include means for comparing an address of said selected second port with said stored addresses of ports not on said second communications ring.

6. A two-way communications switch as recited in claim 4 further includes address means for storing addresses of ports not on said first communications ring and address means for storing addresses of ports not on said second communications ring.

7. A two-way communications switch as recited in claim 5 wherein said second state machine include means responsive to compared matching addresses for sending an open signal and said address of said selected second port to said first state machine.

8. A two-way communications switch as recited in claim 7 wherein said first state machine includes means responsive to said open signal from said second state machine for arbitrating for control of said first communications ring, and means responsive to controlling said first communications ring for sending a predetermined command to open communications with said selected second port.

* * * * *